Feb. 26, 1935.  R. SELIGMAN ET AL  1,992,330
APPARATUS FOR TREATING LIQUIDS, PARTICULARLY
FOR THE PASTEURIZATION THEREOF
Filed Aug. 25, 1932  8 Sheets-Sheet 6
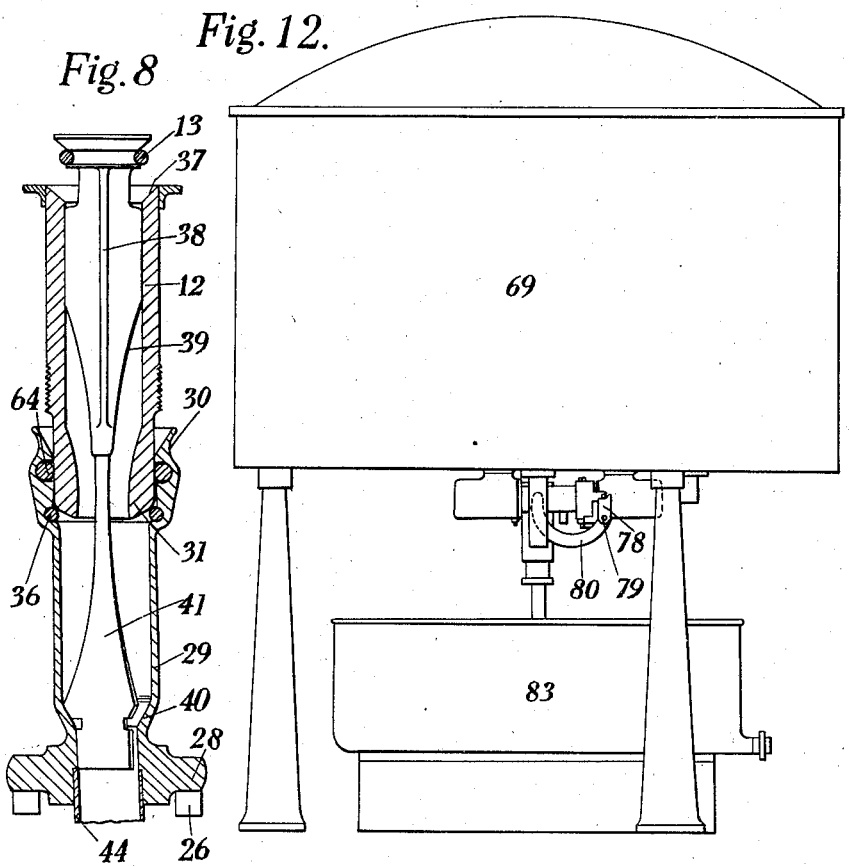
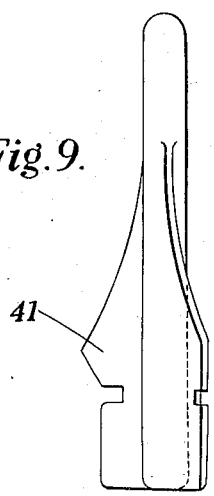
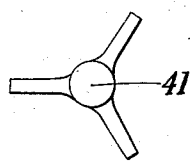
INVENTORS
Richard Seligman
Hugh Frederick Goodman
BY
Nathan Bowman & Helfrich
ATTORNEY

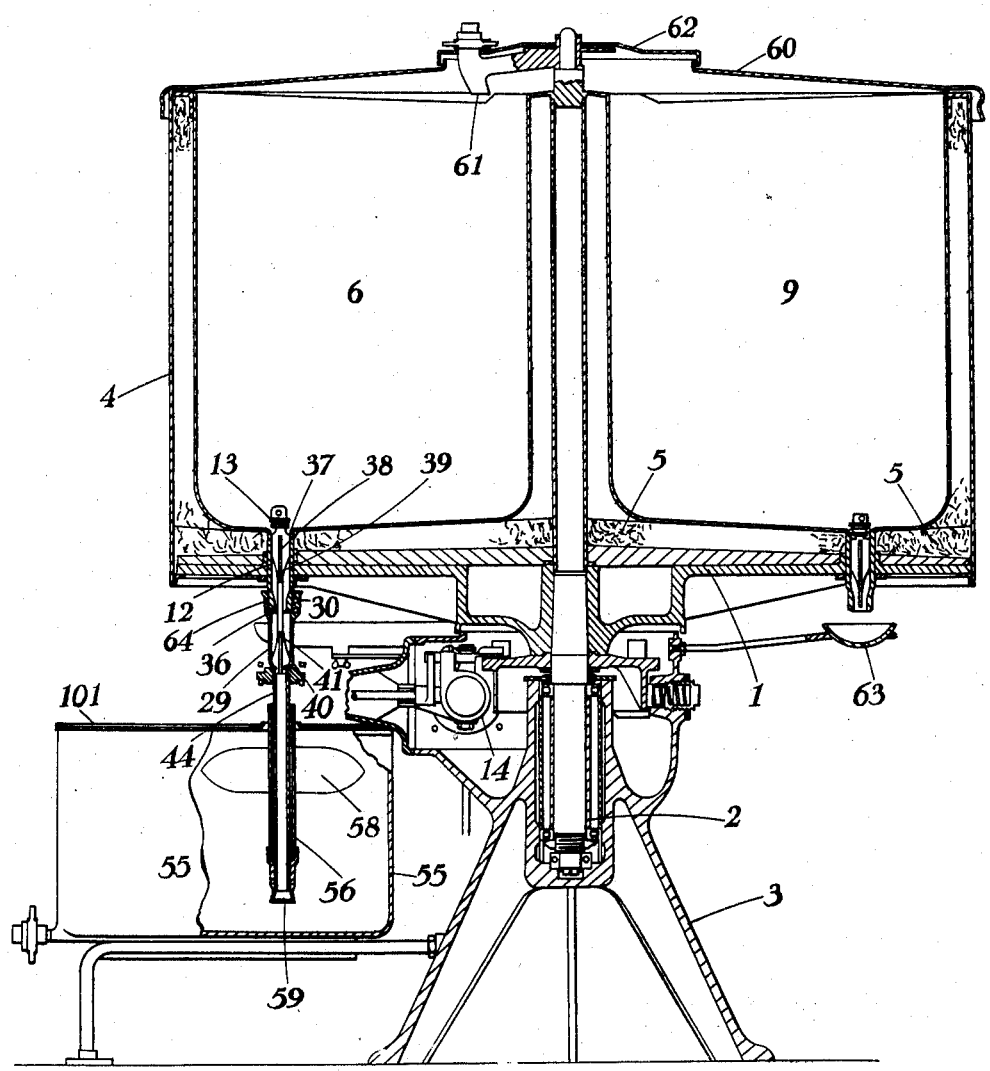

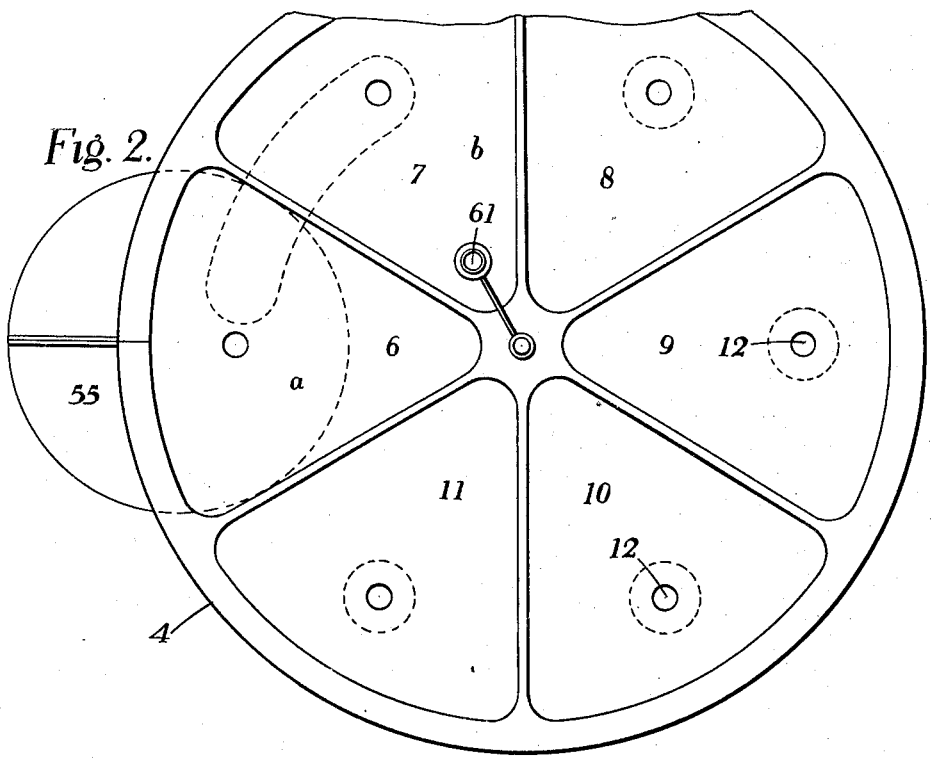
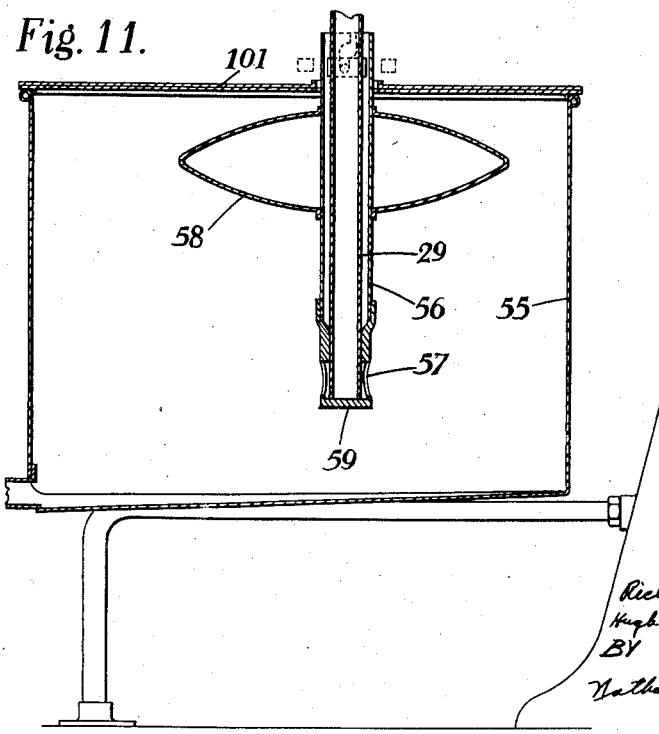

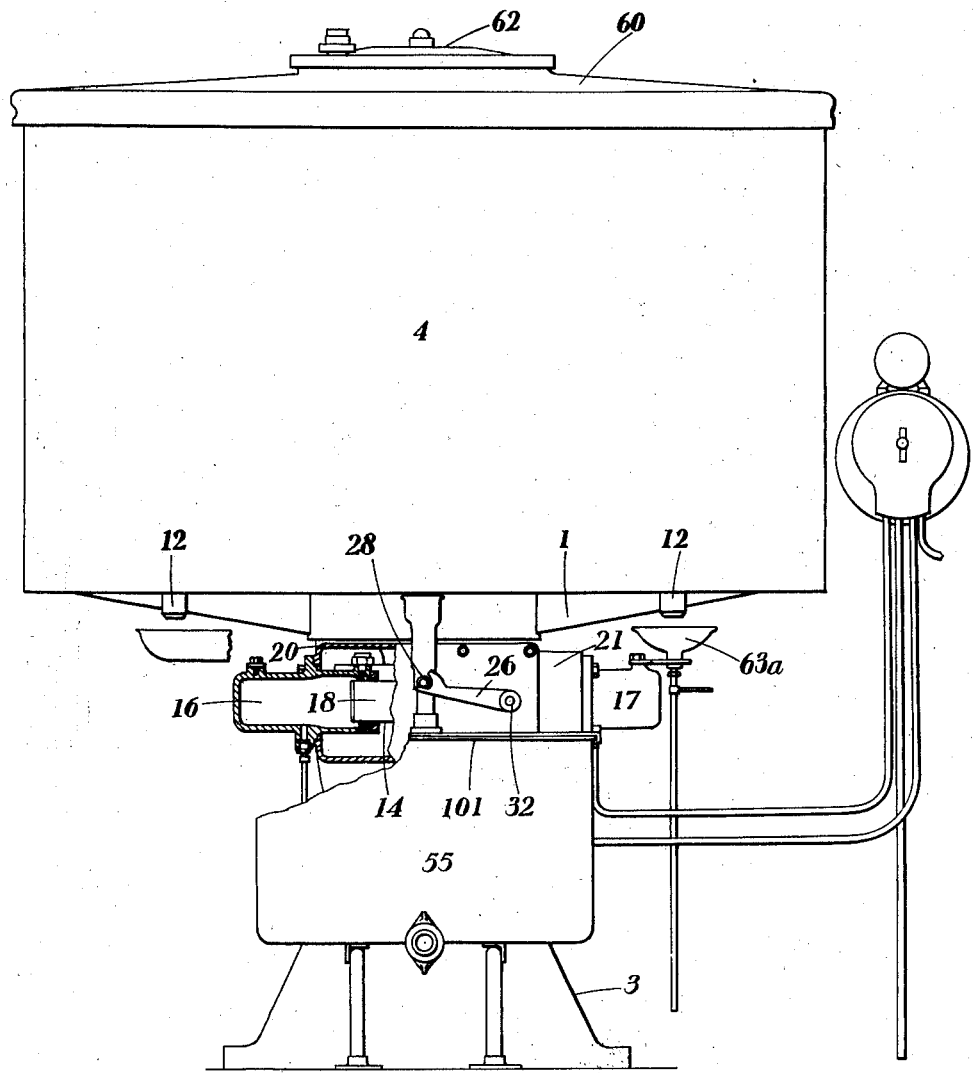

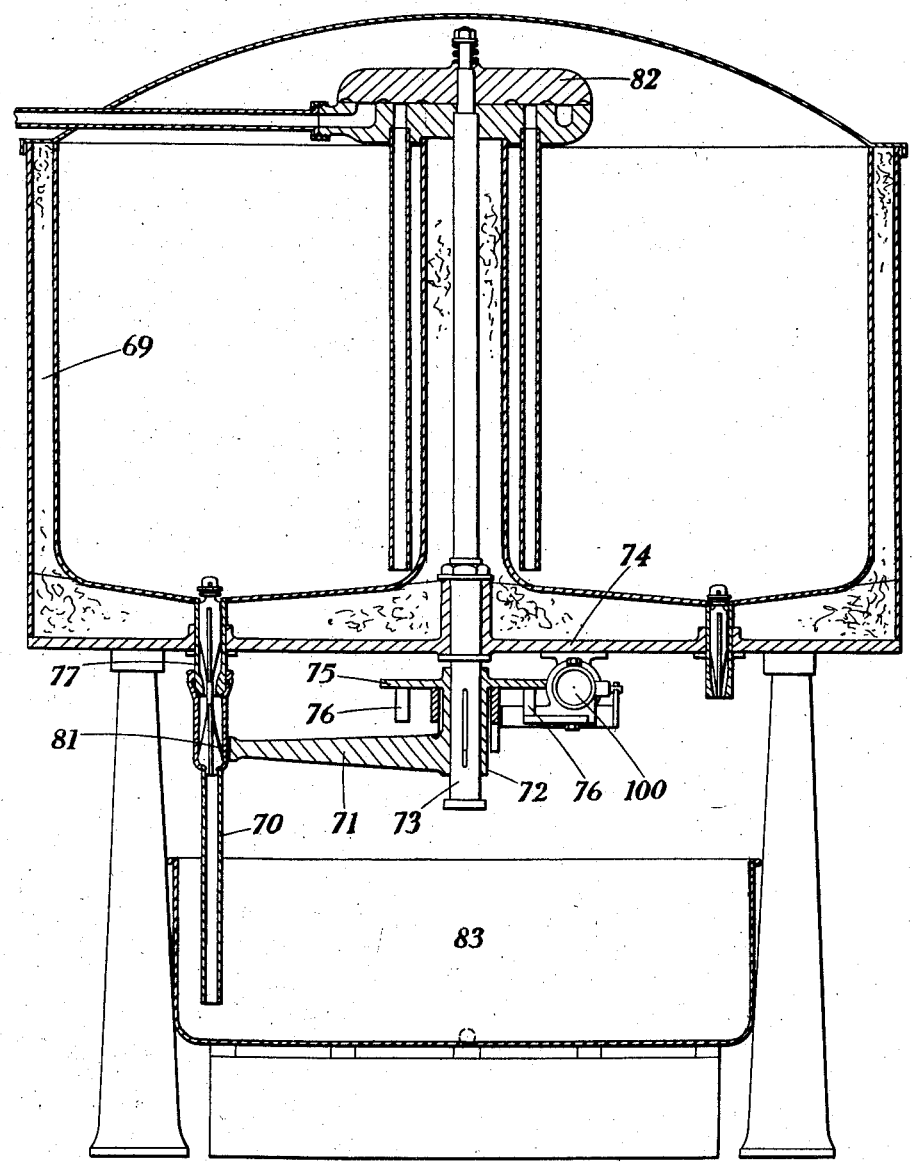

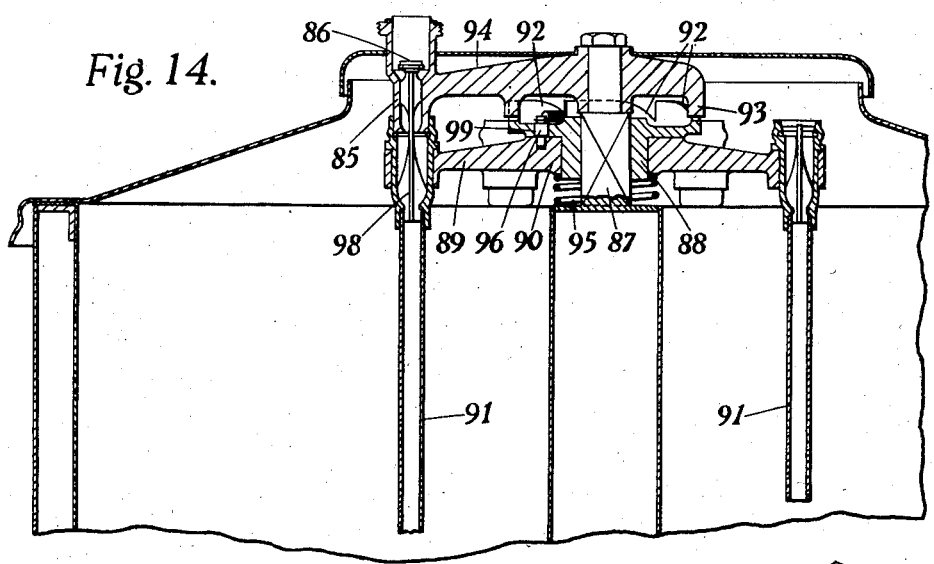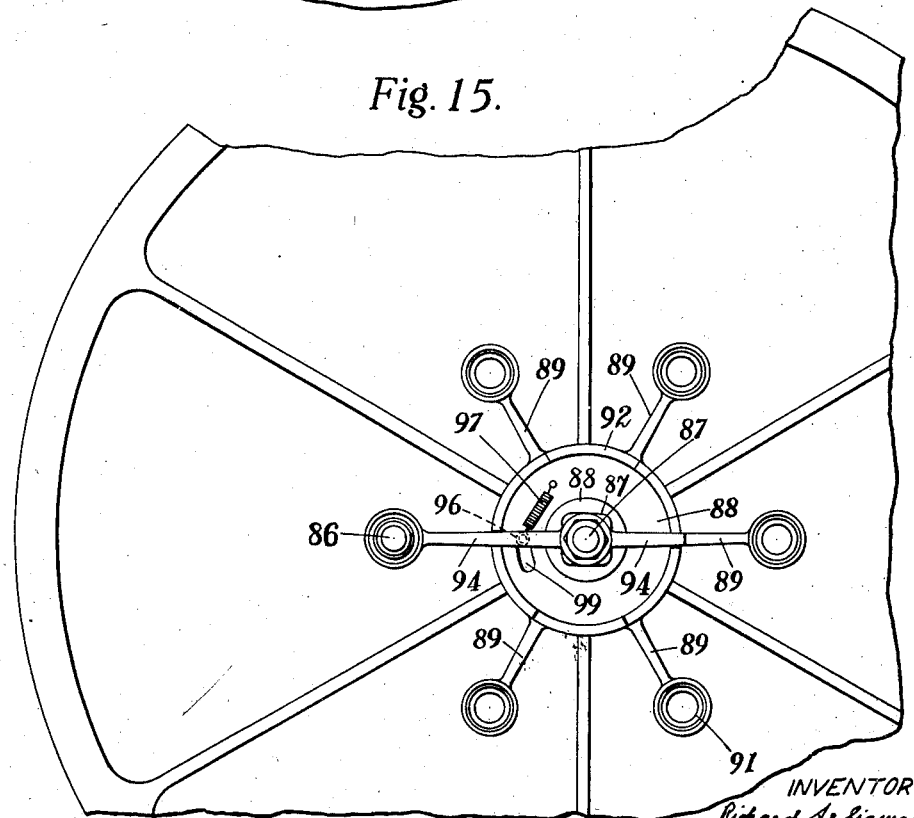

Patented Feb. 26, 1935

1,992,330

UNITED STATES PATENT OFFICE 1,992,330

APPARATUS FOR TREATING LIQUIDS, PARTICULARLY FOR THE PASTEURIZATION THEREOF

Richard Seligman, Wimbledon Common, London, and Hugh Frederick Goodman, Barnes, London, England, assignors to The Aluminum Plant & Vessel Company Limited, London, England Application August 25, 1932, Serial No. 630,418
In Great Britain January 6, 1932

15 Claims. (Cl. 137—21)

The present invention relates to improvements in and relating to apparatus for treating liquids, particularly for the pasteurization thereof.

The invention being particularly applicable to the pasteurization of milk by the so-called positive or absolute holding method, wherein the liquid previously heated is admitted in succession to a plurality of tanks or holders designed to maintain the liquid within certain well known limits of temperature for a definite time, held quietly therein for a definite length of time, and then discharged from the tanks or holders in turn, it will be convenient hereinafter to describe it in that application.

The present invention relates to that class of known apparatus for treating liquids by the above described holding method in which for the purpose of preserving throughout the liquid in each and every holder from reinfection by adventitious flow of liquid from any other holder, each holder is provided with its own discharge valve which is quite distinct from the charging or filling means and which has no communication with any other discharge valve and, except at the time of gravity discharge, with any receiver, conduit or the like for the finished product.

In such an apparatus it is known to arrange the holders and the charging means, also the holders and the discharging means, relatively movable, and to provide means for imparting continuous or intermittent relative movement thereto for relating the holders and the charging means, also the holders and the discharging means, for successively filling and discharging the holders respectively, and also to provide manually or mechanically actuated means for opening the discharge valve of the holder which for the time being is related for discharge to the receiver or like.

As hitherto proposed the gravity discharge of the holders into the receiver or the like has been by jet flow, i. e., by a stream bounded laterally by air in the gap between the discharge orifices of the holders and the receiver or like, it being understood that there is a relative movement between the holders and the discharging means.

By the present invention there is provided a sealed pipe flow gravity discharge, that is to say, the stream from the holder is completely bounded laterally by a solid boundary until that boundary ends or is interrupted for discharge within the receiver or like.

Thus at the end of their holding period the holders are enabled to discharge their contents by pipe gravity flow extending into the receiver, conduit or like, and preferably below the level of the liquid therein, so as to avoid or minimize the disk of air-borne reinfection. In doing this foam formation is also reduced or prevented. Further under the present invention means as hereinafter referred to may be provided for automatically fluid tightly coupling the charging nozzle with a filling pipe leading into the holder.

The present invention consists in an arrangement of liquid treating apparatus of the kind described, in which at the end of a holding period of any given holder the discharge orifice of that holder is automatically fluid tightly coupled with a pipe by which a pipe gravity flow discharge of the holder into a receiver, conduit or like is realized so that a discharge by jet flow through air with the attendant risk of air-borne reinfection is avoided or greatly minimized.

In a convenient and advantageous construction of apparatus of the class hereinabove referred to, a pipe flow discharge of a series of holders in succession may be attained by a discharge pipe common to all the holders by utilizing the shift periods of a relative intermittent movement imparted to the holders and their common discharge pipe to relate successively the holders for discharge through such pipe during the stationary periods during which the discharge pipe is coupled with the holder discharging orifice for the time being in register therewith.

In one embodiment hereinafter described the discharge pipe and receiver or like are stationary while the holders move step by step to bring them successively to the discharging and charging stations. In the compact form of this apparatus hereinafter described the holders are arranged in a circular series on a platform which is rotated intermittently about a vertical axis for the purpose above referred to, the holding period for any holder lasting from the moment it leaves the charging station to the moment it is opened for discharge at the discharging station.

In a variant form of the invention the holders are stationary, and the discharge pipe moves step-by-step to relate the holder sections for discharge. In a constructional form of such apparatus the discharge pipe moves with a rotating arm and means are provided to impart an axial or sliding movement to the arm so that when the discharge pipe is in a position directly below the outlet orifice of a given holder section it is moved vertically to make fluid tight connection therewith.

A stationary valved charging nozzle may be provided which communicates with the charging apparatus, while each holder section is provided with a filling pipe, which rotates with the holders, and is vertically or axially movable to enable it when brought into register with the stationary feeding pipe to be fluid tightly coupled therewith for filling the corresponding holder section.

Preferably co-operating means are provided in any of the foregoing constructions between the holder discharging or charging valve and the discharging or filling pipe for opening the discharging or charging valve automatically as the coupling is made with the holder.

The intermittent movement may be variously effected. It is preferred however to effect this movement by a hydraulic or pneumatic ram and appropriate trips co-operating with a circular series of stops suitably disposed on the rotating part.

The "go" stroke of the intermittent movement having conveyed a holder section to the discharging station, or the discharge pipe to the holder to be discharged, the "return" stroke of the movement is conveniently made by appropriate means to couple the discharge pipe with the discharging orifice of the holder. To facilitate this means are provided for exactly registering a holder section with the discharge pipe for the coupling operation.

Appropriate timed control is made of the admission and exhaust of the working fluid for operating the ram.

Conveniently and advantageously a float control of the level of the liquid in the receiver may be provided especially in cases where it may be necessary or desired to arrange the capacity of the receiver smaller than that of any given holder.

During the stationary period immediately preceding the shift period during which the discharge orifice of a given tank is to be related for pipe flow discharge, it is convenient to provide means whereby a sterilizing steam or hot water spray is projected on to that orifice. Each orifice in turn is so treated in case it may have become contaminated during the holding period.

In order that the present invention may be the more readily understood we will describe it with the aid of the accompanying drawings which illustrate constructional forms thereunder.

In the drawings:—

Fig. 1 is a part vertical section of one form of apparatus in which a stationary receiver is related to a circular series of tanks which are given an intermittent rotation about a vertical axis.

Fig. 2 a plan.

Fig. 3 a front view with certain parts broken away and in section.

Fig. 4 an enlarged view of the intermittently rotating platform which supports the tanks and a duplex hydraulic ram and trip mechanism for intermittently rotating the platform and operating the lifting mechanism for coupling the discharge pipe with the discharge orifice of the tanks in succession.

Fig. 5 a partial plan view of Fig. 4.

Fig. 6 a section on the line A—A of Fig. 5.

Fig. 7 a sectional detail of one of the yoke ends into which the cylinders of the hydraulic ram are fitted showing the arrangement of the water inlets and outlets to the cylinders.

Fig. 8 an enlarged view of the discharge orifice of any given tank, showing the upper portion of the discharge pipe fluid tightly coupled therewith.

Figs. 9 and 10 side end views respectively of the valve lifter which is provided in the discharge pipe for automatically opening the discharge valve of any given tank.

Fig. 11 a sectional view of the receiver and of the discharge pipe depending thereinto, showing how the discharge pipe may be provided with a float control cut off to regulate the flow to the receiver in accordance with the rate at which the contents of the receiver are conveyed elsewhere.

Figs. 12 and 13 show in front elevation and side elevation, partly in section, a variant form of apparatus, in which the holding tanks are stationary and the discharge pipe rotates.

Figs. 14 and 15 are part sectional elevation and plan respectively of apparatus embodying a fluid-tight pipe flow filling arrangement.

Figure 4:
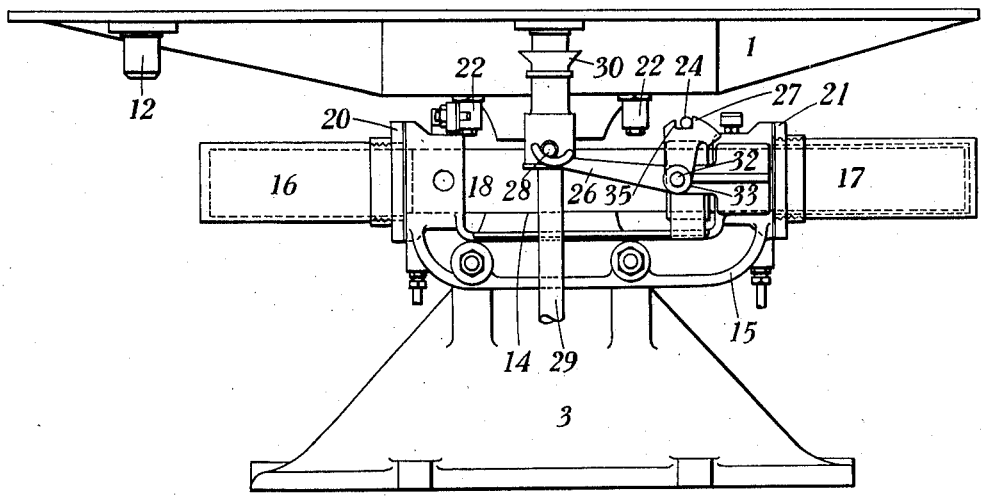

In carrying the present invention into practical effect in accordance with the embodiment illustrated in Figs. 1 to 12 of the accompanying drawings, a platform or support 1 is rotatably mounted for example by means of a vertical shaft foot step bearing 2 in a conical pedestal 3, and upon such platform and within an outer casing 4 and insulated therefrom by suitable non-conducting material 5 are mounted a number of radial compartments or holder sections 6—11.

From each section depends a short discharge tube 12 having a self-closing discharge valve 13 which has no communication with any other valve and is normally closed conveniently by its own weight.

Conveniently and advantageously the floor of each section 6—11 slopes downwards to the discharge tube 12, and the outlet of each section 6—11 is disposed medially of its section adjacent the outer periphery of the sections regarded as a group.

For imparting a timed intermittent drive of rotation to the platform 1 and with this the group of holder section 6—11 mounted thereon, a duplex hydraulic or pneumatic ram 14 is provided which is mounted on a supporting yoke 15 carried by the pedestal 3.

This duplex ram 14 consists of opposed aligned spaced cylinders 16 and 17, in and between which a ram 18 common to both cylinders is moved to and fro by the timed admission and exhaust of working fluid to and from such cylinders.

Figure 5:
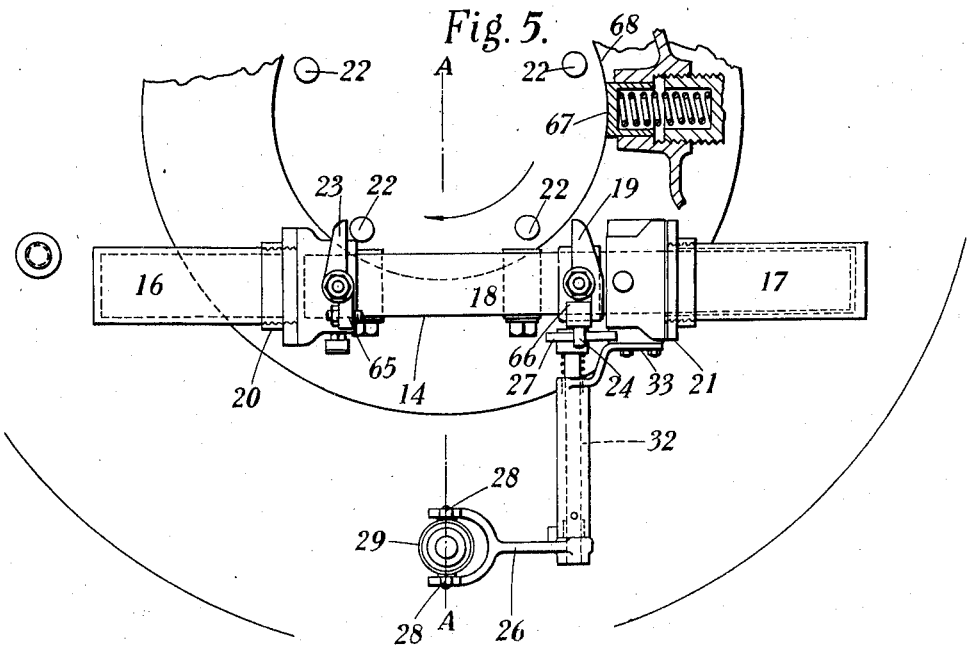
Figure 6:
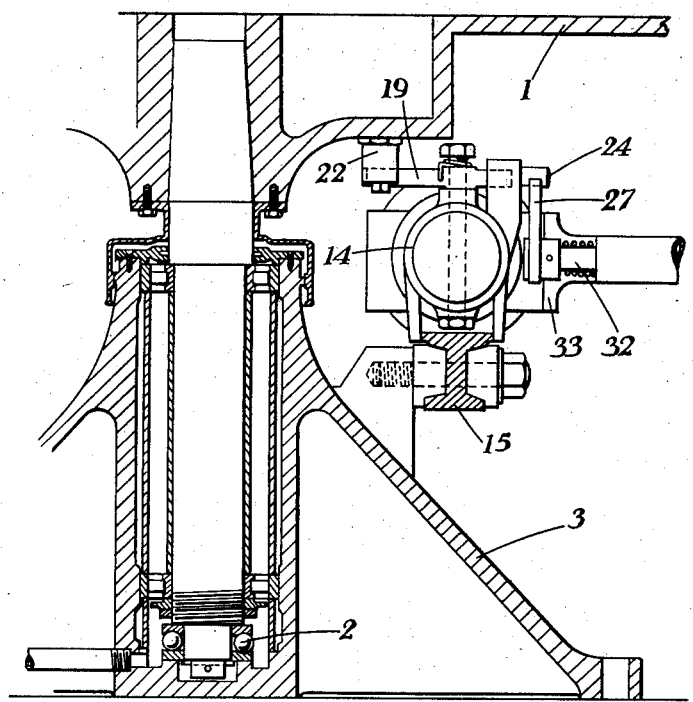
Figure 7:
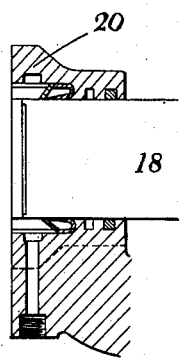

The disposition of the ram is such, as shown in Figs. 4, 5 and 6, that a pivoted trigger 19 attached to and travelling to and fro with that portion of the ram which lies intermediate of the yoke ends 20 and 21, and is adjacent to the yoke end 21 when the ram is moved to the right in Fig. 5, is adapted to engage a stud 22 of which a circular series is provided on the underside of the platform 1, one for each holder, these studs 22 being equally spaced apart so as to enable the platform 1 to be rotated through recurring angular displacements of 60° to bring the holder sections 6—11 successively to the discharging station at the end of their holding period.

In so intermittently rotating the holder by the travelling trigger 19, the stud 22, at the end of the 60° angular displacement above referred to, is arranged to make contact with a retaining trigger 23 which is pivotally mounted on the yoke end 20 and is under spring bias to permit the stud 22 at the next movement to trip by the retaining trigger 23, but when the stud 22 which for the time being is required to be arrested by the retaining trigger 23 to bring a given holder section at the end of its holding period to definite discharging position, such retaining trigger 23, which can yield somewhat if the holder group 6—11 tends to over-run the ram, and which is provided with a tail piece 65, is caused to clamp the stud 22 between the travelling trigger 19 and the retaining trigger 23 by a projection 66 on the ram being arranged to engage the tail 65 of the retaining trigger 23 and hold, or return and hold, this so that the holder group is held or drawn and held to definite position by hydraulic pressure until the ram 14 makes its return movement during which the holder to be discharged is automatically connected for pipe gravity flow discharge into a receiver or the like.

When any given holder section 6—11 has thus been brought to definite discharging position, the time control of the ram opens the right hand cylinder 17 to exhaust and the left hand cylinder 16 to the admission of working fluid whereby the ram 14 is returned to the position shown in Fig. 5.

Towards the ends of its return stroke, the stud 24 operates an arm 26 through the medium of a notched rocker arm 27 the arms 26 and 27 forming a virtual bell crank lever. The forked arm 26 of the bell crank lever engages diametrical studs 28 radially projecting from the discharge pipe 29 having a flared upper end 30 which is adapted to be coupled fluid tightly with a coned seating 31 at the end of the discharging tube 12. The discharge pipe 29 depends into a covered collecting receiver 55.

The arm 26 is fast with the outer end of a spindle 32 which is mounted in a lateral bearing bracket 33 supported on the yoke end 21, and the arm 27 is fast with the inner end of the spindle 32 which is of such a length that the forked arm 26 is disposed in proper position for lifting the discharge pipe 29 to couple this with the holder discharge tube 12 which is at a greater radial distance from the centre of the holder group 6—11 than the line of the ram 14.

In the "go" stroke of the ram the stud 24 contacts with the short shoulder 35 of the notched free end of the rocker arm 27 and permits the coupling connection of the discharge pipe 29 to be broken conveniently by its own weight. If desired however, and it will be generally found necessary where multiple packing rings as shown in Fig. 8 are employed, a positive breaking of the coupling may be effected such as by forking the arm 26 in the manner shown in Fig. 3.

As shown more clearly in Figs. 1, 4 and 8 each holder discharge tube 12 projects below the platform 1 and terminates in a coned seating 31 on which a ring joint packing 36 preferably of rubber having a circular section, held in an annular recess of the discharge pipe 29 located within the upper end of the discharge pipe, is adapted to seat when the discharge pipe 29 and the discharge tube 12 are coupled spigot and faucet fashion as shown in Fig. 8.

Above the ring joint packing 36 of the discharge pipe 29 is a second similar packing 64 so arranged however as to slide over the discharge tube 12 and seal the discharge outlet by circumferential pressure before the lower packing 36 seats against the cone seating 31.

The multiple packing 36 and 64 is advantageous in cases where a controlled outflow from the discharge pipe 29 is provided as hereinafter described, but a multiple jointing may not be necessary where the discharge pipe 29 has a free outlet at the bottom.

At its upper end the discharge tube 12 is provided with a valve seating 37 on which the discharge valve 13 seats, this valve being provided with a depending spindle 38 having radial guide webs 39 to co-operate with the inner wall of the discharge tube 12, and the upper part of the discharge pipe 29 is provided with a seating 40 for the corresponding shaped lower end of a radially webbed valve lifter 41 which in the act of coupling the discharge pipe 29 with the discharge tube 12 automatically lifts the discharge valve 13 through its stem or spindle 38.

Adjacent the valve lifter seating 40 the discharge pipe 29 carries lifting studs 28, and has secured to the inner wall a tube 44 conveniently a copper tube sweated in.

Referring to Fig. 2 a indicates the discharging station and b indicates the charging station from which until a given holder arrives at the discharging station the liquid contents of that holder is quietly held.

Any suitable time control may be provided of the intermittent actuation of the ram by which the step by step rotation of the holder group is effected. This may be realized by providing an appropriate timed control for the admission and exhaust of the working fluid which operates the ram.

A receiver 55 with a cover 101 is provided for the discharged milk.

In cases where it is convenient or desired to employ a receiving vessel 55 of smaller capacity than that of the holder which is discharging its contents thereinto, Fig. 11 shows the provision on the portion of the discharge pipe 29 which depends into the receiver of a sleeve 56 having discharge orifices 57 adjacent its ends, this sleeve being connected to a float 58 and having a closed end 59 which at the cut off level of the float is in close proximity to the end of the discharge pipe 29 so that the flow to the receiver may be regulated in accordance with the rate at which the contents of the receiver are conveyed away.

The holder group is provided with a suitable cover 60 which is centrally perforated to admit a non-rotating liquid charging nozzle 61 over which a smaller cover 62 is placed.

From this charging nozzle 61 the sections 6—11 are suitably charged up to a predetermined level by any suitable method of control.

For the purpose of catching any drips from the discharge valves 13 of the holder sections 6—11 an annular trough 63 may be suitably carried below the path of the discharge valve 13 or independent bowls may be employed at the stationary positions of the discharge orifices 12 of the separate holders.

A nozzle 63a may be provided as shown in Fig. 3 through which a sterilizing steam or hot water spray may be projected on to each valve discharge orifice in turn before reaching the discharging station.

The apparatus illustrated in Figs. 12 and 13 differs mainly from that just described in that the holding tanks and their casing 69 are stationary and the discharge pipe 70 rotates.

The discharge pipe 70 is secured to the outer end of a radial arm 71 integral with a sleeve 72 which rotates with a spindle 73 rotatably mounted in the base 74 but is free to move axially on said spindle.

Secured to the underside of a plate 75 fast with the sleeve 72 are a number of studs 76, one for each of the six holder sections, which studs are engaged by trigger mechanism and operated by hydraulic ram mechanism 100 similar to that hereinbefore described.

In operation the ram will move the sleeve 72 through angular displacements of 60°. In the "go" stroke of the ram the discharge pipe 70 will be positioned beneath the discharge tube 77 of the holder section to be discharged, and in the return stroke of the ram this will engage and turn a lever or link 78 which is fast to a spindle 79 on the other end of which is secured a forked arm 80 which presses on the under side of the sleeve 72 and lifts the sleeve and with it the discharge pipe 70 and the valve lifter 81, the discharge pipe engaging with the discharge tube 77 and making a fluid tight joint therewith.

82 is a distributing valve of the ported type for controlling the inlet of liquid to the tanks.

A receiver 83 is provided for the discharged milk. The discharge pipe may be fitted with a float control valve as in the previously described embodiment.

The discharge pipe may be attached to a rotating cover so as not to expose the receiver to the air.

A trough may be provided to collect any liquid which may drip past the different valves.

Figs. 14 and 15 depict apparatus for effecting a sealed pipe flow filling at the charging station.

This apparatus is shown applied to a rotating holder system although by suitable alteration it may be equally satisfactorily applied to a system in which the holders are stationary.

The apparatus comprises a fixed charging nozzle 85 having a valve 86.

87 is a spindle which rotates with the rotating holders and 88 is a flanged sleeve which is rotatably fast but axially free with respect to the spindle 87. 90 is a central hub having radial arms 89 each of which carries a filling pipe 91, one for each holder section. The radially armed hub 90 also rotates with the spindle but is free to move axially with respect thereto.

The flanged sleeve 88 is provided with cams 92 which work on the bottom of a rim 93 depending from the fixed arm 94 which carries the charging nozzle.

In the position shown in Figs. 14 and 15 one of the filling pipes 91 is in sealed connection with the charging nozzle 85, being held in this position by a spring 95 acting on the under face of the hub 90.

On rotating the spindle 87 the sleeve 88 descends under the action of the cams 92 and moves down the hub 90 carrying the filling pipes.

In order to permit the filling pipe which has been in action to descend clear of the charging nozzle and revolve about the axis of the spindle a certain lost motion is permitted by which the sleeve 88 rotates over a predetermined distance before the hub 90 commences its rotating movement. The extent of this lost motion is determined by a pin and slot action consisting of a slot 99 in the sleeve and a pin 96 on the hub projecting into the slot. The sleeve in rotating relatively to the hub tensions a spring 97 which enables the hub to recover its lost motion when the filling pipe is free from the charging nozzle.

As the filling pipe rises to make sealing connection with the charging nozzle the valve 86 is opened by a rod 98.

When the device has moved through 60° the end of the cam is reached and the sleeve and the hub are raised by the spring 95 to engage the next filling tube with the charging nozzle.

Obviously the arm 94 which carries the charging nozzle may be made the axially movable member in making and breaking the coupling connection between the charging nozzle and the filling pipe.

In any of the foregoing arrangements a convenient cycle of operation is one in which the filling time occupies 7½ minutes, the holding time 30 minutes, and the discharging time 6 minutes, and a neutral time of 1½ minutes during which neutral time the holder section immediately following that still presented to the feeding stream travels empty and with its outlet closed.

By a time control such as herein described or some other equivalent control, the control of the apparatus is made automatic and the times can be varied to suit different conditions by varying the reduction ratio of the particular control herein referred to.

Use may be made of any available or conveniently arranged space in the apparatus for heating purposes, the introduction of one or more hot water coils being an example of one heating arrangement which will serve.

In cases where the holder group may tend to rotate too freely, a breaking device e. g., a friction brake 67 (see Fig. 5) may be applied to the periphery 68 of the holder group 6—11.

The term receiver in the claims is intended to cover a receiver, conduit, or other discharging station.

What we claim is:—

1. Liquid treating apparatus of the character described, comprising in combination, a series of holders, a stationary receiver, a discharge pipe leading to said receiver, a discharge orifice having a self-closing control valve for each holder, means comprising a fluid actuated ram mechanism and appropriate trips co-operating with a series of stops for imparting an intermittent rotation to said series of holders so as to bring any given holder at the end of its holding period to a definite discharging position, and means related to the ram for thereafter coupling the discharge pipe with the discharge orifice of the holder and opening the control valve, by which a pipe flow discharge of the holder into the receiver is realized.

2. Liquid treating apparatus according to claim 1, having means for bringing the holder group to its correct position if it overruns.

3. Liquid treating apparatus according to claim 1 having a nozzle for projecting a sterilizing spray on to a discharge orifice just prior to connecting that orifice to discharge.

4. Liquid treating apparatus of the character described, comprising in combination, a vertical shaft, a support, a series of holders thereon, each holder having a discharge tube with a self-closing discharge valve normally closing the way from the holder to the tube, which has no communication with any other valve, a stationary receiver, a discharge pipe depending into said receiver, means for imparting an intermittent drive to said series of holders so as to bring any given holder at the end of its holding period to a definite discharging position, and means for thereafter coupling the discharge pipe with the discharge orifice of the holder and opening the said self-closing discharge valve by which a pipe gravity flow discharge of the holder into the receiver is realized.

5. Liquid treating apparatus of the character described, comprising in combination, a series of stationary holders each holder having a discharge tube with a self-closing discharge valve normally closing the way from the holder to the tube, and which has no communication with any other valve, a receiver, a discharge pipe depending into said receiver, means for imparting an intermittent drive to said discharge pipe so as to position this beneath the discharge tube of the holder to be discharged, and means for thereafter coupling the discharge pipe with the discharge orifice of the holder and opening the said self-closing discharge valve by which a pipe gravity flow discharge of the holder into the receiver is realized.

6. Liquid treating apparatus comprising a group of holders, filling means and discharging means for said holders, fluid actuated ram mechanism and means co-operating therewith for imparting a relative movement between said series of holders and the filling means and discharging means so that any given holder at the end of its holding period is connected to the discharging means for emptying and thereafter to the filling means for filling.

7. Liquid treating apparatus, comprising a group of holders, filling means and discharging means for said holders, fluid actuated ram mechanism and means co-operating therewith for imparting a relative movement between said series of holders and the filling means to connect any given holder to the filling means for filling.

8. Liquid treating apparatus, comprising a group of holders, filling means and discharging means for said holders, fluid actuated ram mechanism and means co-operating therewith for imparting a relative movement between said series of holders and the discharging means to connect any given holder to the discharging means for emptying.

9. Liquid treating apparatus, comprising a group of holders, pipe flow filling means and pipe flow discharging means for said holders, fluid actuated ram mechanism and means co-operating therewith for imparting a relative movement between said series of holders and the filling means and discharging means so that any given holder at the end of its holding period is connected to the discharging means for emptying and thereafter to the filling means for filling.

10. Liquid treating apparatus comprising a group of holders, pipe flow filling means and discharging means for said holders, fluid actuated ram mechanism and means co-operating therewith for imparting a relative movement between said series of holders and the pipe flow filling means to connect any given holder to the filling means for filling.

11. Liquid treating apparatus, comprising a group of holders, filling means and pipe flow discharging means for said holders, fluid actuated ram mechanism and means co-operating therewith for imparting a relative movement between said series of holders and the pipe flow discharging means to connect any given holder to the discharging means for emptying.

12. Liquid treating apparatus, comprising a group of holders, filling means and pipe flow discharging means for said holders, fluid actuated ram mechanism and means co-operating therewith for imparting a relative movement between said series of holders and the pipe flow discharging means to connect any given holder to the discharging means for emptying, and a float control cut-off for the discharge.

13. Liquid treating apparatus, comprising a group of holders, means for filling said holders, a discharge station, fluid actuated ram mechanism and means co-operating therewith for imparting a relative movement between said series of holders and the discharge station to connect any given holder to said discharge station for emptying.

14. Liquid treating apparatus comprising a group of holders, each holder being emptied at the end of its holding period, a filling station, fluid actuated ram mechanism and means co-operating therewith for imparting a relative movement between said series of holders and the filling station to connect any given holder to said filling station for filling.

15. In apparatus for treating liquids of the character described, a plurality of closed holders, a receiver or conduit for the finished product, each holder having its own discharge orifice, which has no communication with any other discharge orifice, and there being normally an air gap between the discharge orifice of each holder and the receiver or conduit, so that except at the time of discharge there is no communication with said receiver or conduit, and means for fluid tightly coupling a discharge orifice of any given holder to a discharge pipe for emptying said holder on the opening of the discharge orifice at the end of a holding period, by which a pipe gravity flow discharge of the holder through the air gap into a receiver is realized.

RICHARD SELIGMAN.
HUGH FREDERICK GOODMAN.